(12) United States Patent
Mochimaru et al.

(10) Patent No.: US 6,597,369 B2
(45) Date of Patent: Jul. 22, 2003

(54) VIRTUAL SHAPE GENERATION METHOD AND DEVICE USING THE SAME

(75) Inventors: Masaaki Mochimaru, Ibaraki (JP); Makiko Kouchi, Ibaraki (JP)

(73) Assignee: Agency of Industrial Science and Technology, Tokyo (JP)

(*) Notice: Subject to any disclaimer, the term of this patent is extended or adjusted under 35 U.S.C. 154(b) by 390 days.

(21) Appl. No.: 09/749,874

(22) Filed: Dec. 29, 2000

(65) Prior Publication Data

US 2002/0003546 A1 Jan. 10, 2002

(30) Foreign Application Priority Data

May 31, 2000 (JP) .................................... 2000-161896

(51) Int. Cl.[7] .............................................. G09T 17/00
(52) U.S. Cl. ........................................ 345/647; 345/420
(58) Field of Search ................................ 345/419, 420, 345/582, 646, 647, 441; 382/111, 118, 154, 190, 195, 203, 206, 307, 308, 318, 325

(56) References Cited

U.S. PATENT DOCUMENTS 6,356,272 B1 * 3/2002 Matsumoto et al. ........ 345/582

OTHER PUBLICATIONS

MacCracken et al. "Free–Form Deformations With Lattices of Arbitrary Topology" ACM SIGGRAPH 1996.*

Curless et al. "A Volumetric Method for Building Complex Models from Range Images" ACM SIGGRAPH 1996.*

* cited by examiner

Primary Examiner—Almis R. Jankus
(74) Attorney, Agent, or Firm—Oblon, Spivak, McClelland, Maier & Neustadt, P.C.

(57) ABSTRACT

The present invention is to propose a method and device which evaluate the shape and the size of each part of a human body in a multidimensional manner, generate a distribution map thereof, and compute and realize a virtual shape located in the periphery of the distribution map, whereby the shape and the size of a product such as clothing can be modified and designed. The virtual shape forming unit computes a space distortion function which mutually distorts three-dimensional shape data of a plurality of people, generates a multidimensional distribution map thereof based on the size of the distorted space, and derives a virtual shape which exists on an arbitrary location of the multidimensional distribution map.

2 Claims, 6 Drawing Sheets

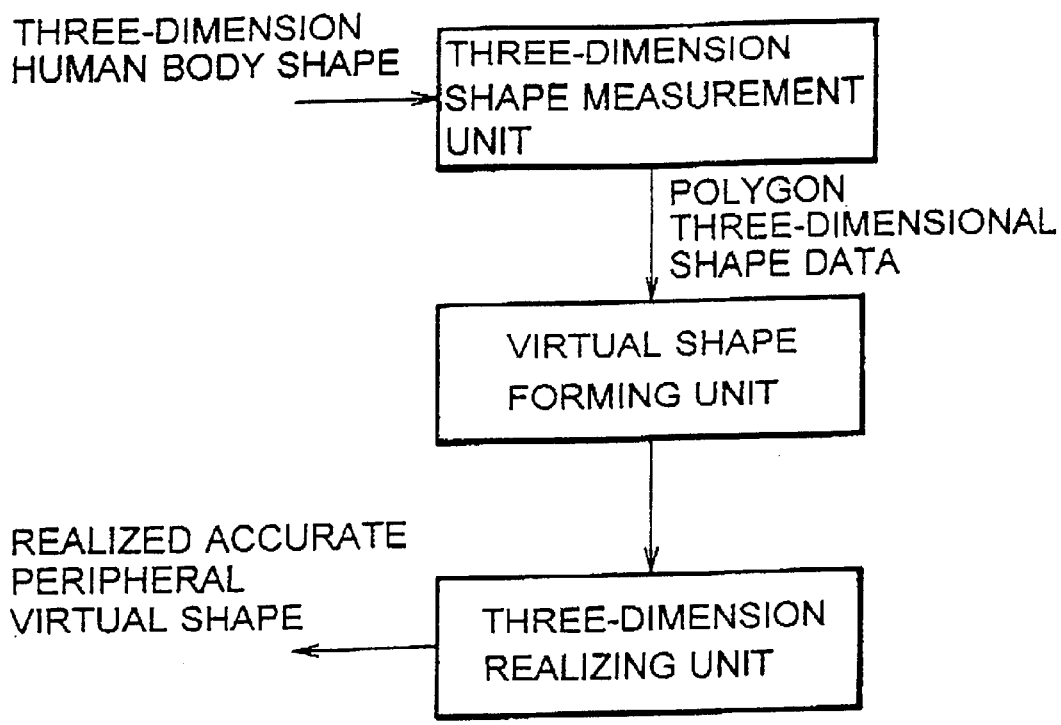
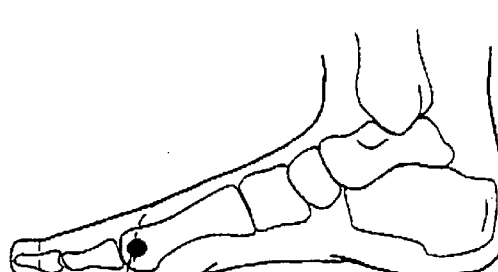
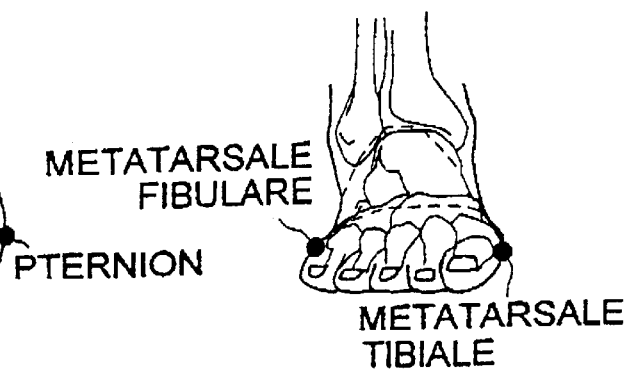

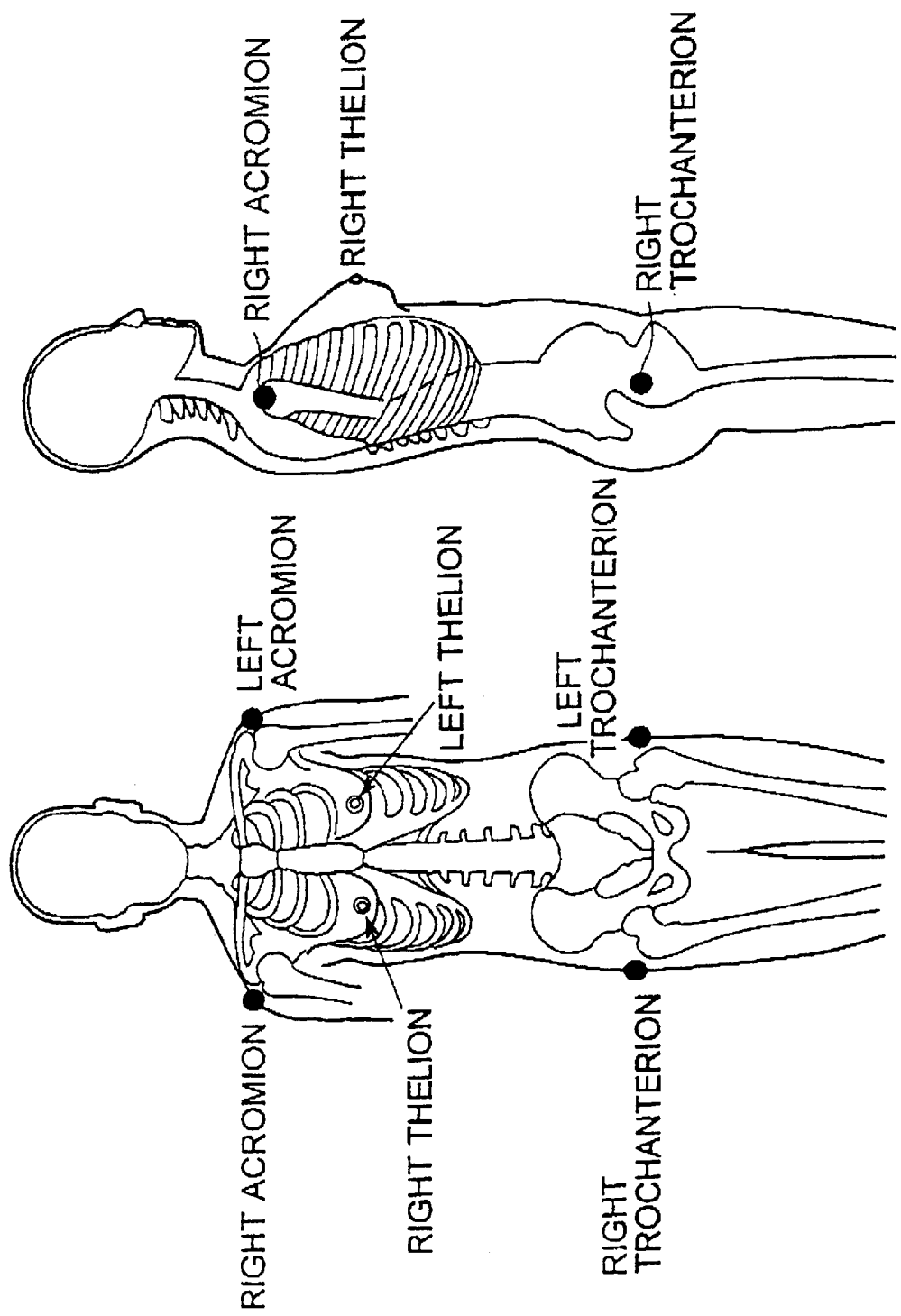

VIRTUAL SHAPE GENERATION METHOD AND DEVICE USING THE SAME

TECHNICAL FIELD OF THE INVENTION

The present invention relates to a virtual shape generation method and a device using the same for modifying and designing the shape and the size of a product so as to correspond to those of a human body.

DESCRIPTION OF THE RELATED ART

When a product, such as clothing adjusted to a customer, is designed as not a custom-made product but a mass production product for a group (a specific customer bracket), a group having a similar shape is extracted from among a distribution map of a plurality of three-dimensional human body shapes to design the product that is adjusted to the group. In this case, not only product design for the average shape representing the group, but also compatibility evaluation of the product to a virtual shape located in the periphery of the variations of the group must be needed. To achieve this, there are required:

(1) creation of the distribution map of a plurality of three-dimensional human body shapes that are described using numerical data;
(2) creation of a virtual shape located in the periphery of the distribution map; and
(3) a consistent method and a device using the same for realizing this virtual shape.

Particularly, since the distribution of the three-dimensional human body shapes cannot be sufficiently represented by means of a linear distribution such as one distributed in a "smaller to larger" manner, multidimensional distribution map in which the shape and the size of the human body are represented must be derived. For example, in a linear distribution such as one distributed in the "smaller to larger" manner, a person having "the shortest height, the shortest waist girth, the shortest legs, and the smallest head among the group" at the same time and a person having "the tallest height, the largest waist girth, the longest legs, and the largest head among the group" at the same time stand on the opposite extremes of the group. However, those having such characteristics hardly exist. Accordingly, there have been expected the consistent generation method and generation device for computing and realizing the virtual shape located in the periphery of the distribution obtained after evaluating the shape and the size of each part of the human body in a multidimensional manner.

As a method for obtaining the distribution map of three-dimensional human body shapes, an art is known in which, by re-describing the human body shape using a B-spline function, the distribution is obtained using the parameter of the function (Taizou Kishimoto, Susumu Kureno, Takao Kurokawa, and Akihiro Shinozaki: Three-dimensional human body shape modeling for clothing CAD, 22nd image engineering conference, pp.235–238, 1991). However, this art only deals with characteristics of the human body as a linear distribution and there is no reference to a method for deriving a multidimensional shape distribution map.

On the other hand, in a method which is already disclosed by the inventors of the present invention (Masaaki Mochimaru, Makiko Kouchi, Yukio Fukui, and Emiko Tsutsumi, Classification of 3D foot shape based on inter-shape distance using the FFD method, Japanese Journal of Ergonomics, 33(4), pp.229–234, 1997), instead of re-describing the human body shape using the function system, characteristics of the human body can be understood as the multidimensional distribution. However, the method using the FFD by Mochimaru, et al. only solves the above problem (1) and neither problems (2) nor (3).

As the method for computing the virtual shape on the distribution map, methods for computing the average shape and the standard deviation shape are disclosed in the article by the above Kishimoto, et al. However, since, as described above, after all, this method computes the standard deviation shape based on the linear distribution of the human body shape characteristics, it cannot compute the standard deviation shape based on the multidimensional human body distribution, which is a feature of the present invention.

Furthermore, this method requires a shape to be re-described using the B-spline function based on the coordinate data of the shape obtained by a shape measurement unit. In addition, in order to accurately describe the shape using the function system, an artifice, such as one in which the number of control points of the spline function must be added in accordance with the sizes of concave and convex parts of the shape, must be needed. This leads to a major problem that a large amount of preprocessing is required.

In the average shape generation method proposed by the inventors of the present invention (Japanese Patent No. 3,106,177, method and device for generating average shape of a plurality of three-dimensional shapes), there is no above mentioned preprocessing problem. However, this method is dedicated to computation of the average shape and there is no reference to computation of the virtual shape in the periphery of the shape distribution map.

PROBLEMS TO BE SOLVED BY THE INVENTION

The present invention is made to solve the foregoing three problems, that is,
(1) creation of the distribution map of a plurality of three-dimensional human body shapes that are represented using numerical data;
(2) computation of a virtual shape that is located in the periphery of the distribution map; and
(3) provision of a consistent method and device for realizing the virtual shape.

MEANS FOR SOLVING THE PROBLEMS

In a method in which three-dimensional shape data of a plurality of people is obtained by measuring the body shape thereof, a multidimensional distribution map is formed based on the three-dimensional shape data of the plurality of people, and a virtual shape located on the periphery of the multidimensional distribution map is formed, whereby the virtual shape is generated, the method for generating the virtual shapes of the plurality of three-dimensional shapes is characterized in that a space distortion function which mutually distorts the three-dimensional shape data of the plurality of people using the free form deformation method is computed a multidimensional distribution map of the three-dimensional shape data of the plurality of people is generated and a virtual shape existing at an arbitrary location of the multidimensional distribution map is derived.

In a device for generating a virtual shape on a distribution map of a plurality of three-dimensional shapes comprising a three-dimensional shape measurement unit for measuring human shapes and outputting the measured human shapes as three-dimensional shape data of a plurality of people, a virtual shape forming unit for forming a multidimensional distribution map based on the three-dimensional shape data of the plurality of people and forming the virtual shape located in the periphery of the multidimensional distribution map, and a three-dimensional realizing unit for realizing numerical data from the virtual shape forming unit, the device for generating virtual shapes of the plurality of three-dimensional shapes is characterized in that the virtual shape forming unit has functions such that a space distortion function which mutually distorts the three-dimensional data of the plurality of people is computed using the free form deformation method, a multidimensional distribution map of the three-dimensional shape data of the plurality of people is generated based on the magnitude of the space distortion, and the virtual shape of an arbitrary location of the multidimensional distribution map is derived.

BRIEF DESCRIPTION OF THE DRAWINGS

FIG. 1 is a block diagram of the overall construction of a virtual shape generation device according to the present invention.

FIGS. 2A and 2B are side and front views, respectively, illustrating anatomical landmarks of a part of a human body.

FIGS. 3A and 3B are side and front views, respectively, illustrating anatomical landmarks of an important part of the human body.

Figure 4:
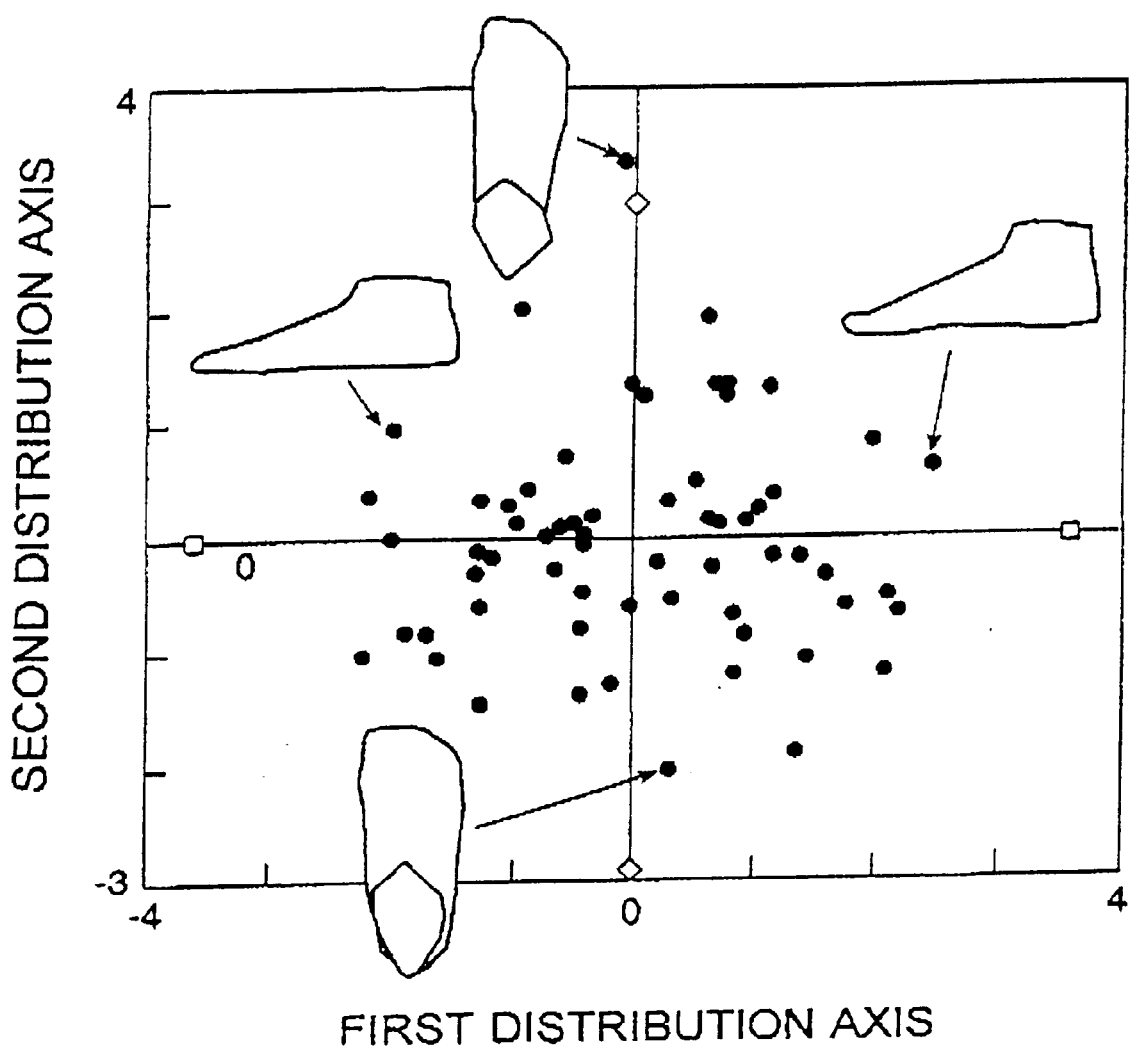
FIG. 4 is a distribution map illustrating an appearance of the human body shape distribution.

The embodiments of the present invention are described with reference to the figures.

The device of the present invention includes a three-dimensional shape measurement unit for inputting a human body shape, a virtual shape forming unit for computing a multidimensional distribution map based on a plurality of human body shapes obtained by the three-dimensional shape measurement unit and forming a virtual shape located in the periphery of the multidimensional distribution map, and a three-dimensional realizing unit for realizing numerical data from the virtual shape forming unit (FIG. 1).

The outlines of the method and device according to the present invention are described in a sequential order of operation processing.

(1) Initially, the human body shapes of a plurality of people (N people) belonging to a target group are measured by the above three-dimensional shape measurement unit.

(2) Next, the measured human body shapes of the N people are modeled based on anatomical characteristics of the human body and then these inter-shape distances are computed, whereby the multidimensional distribution map of the three-dimensional shapes having the distance relationship satisfied is obtained.

(3) In order to compute the virtual shape located at an arbitrary coordinate point of the distribution map, approximately 10 virtual shapes located on the line between the center of the distribution map and the above arbitrary coordinate point are computed by performing interpolation using the human body shapes of the N people. Characteristics of the virtual shapes distorting along the above line are represented as a moving pattern of a control lattice point of the free form deformation method whereby the amount of movement of the control lattice point and the amount of movement along the line on the distribution map are statistically related. Based on this relationship, by extrapolating the control lattice point moving pattern for distorting the virtual shape located at the center to the virtual shape located at the above arbitrary coordinate point and applying this control lattice point moving pattern to the virtual shape located at the center, the virtual shape located at the above arbitrary coordinate point is computed.

(4) The numerical data of the virtual shape located at the above arbitrary coordinate point is realized using the above realizing unit.

Hereinafter, the construction of the present invention is more specifically described.

[Three-Dimensional Shape Measurement Unit]

As the three-dimensional measurement unit, for example, a laser-type shape scanner (which can measure a three-dimensional body as a set of a number of three-dimensional coordinates by projecting a laser thereon) or the like is used. This three-dimensional shape measurement unit measures the human body shapes of the target group (a plurality of people (number N)). The human body shape is not necessarily the whole body and may be the shape of a specific part such as a foot or the head. The human body shape is marked with points corresponding to anatomical landmarks whereby the location data of these characteristic points is obtained along with the three-dimensional shape data. The obtained three-dimensional shape data is reconstructed based on the location data of these characteristic points. In other words, all or part of the coordinate points measured by the three-dimensional shape measurement unit are data which are set so as to correspond to the anatomical landmarks of the human body.

Figure 5A:
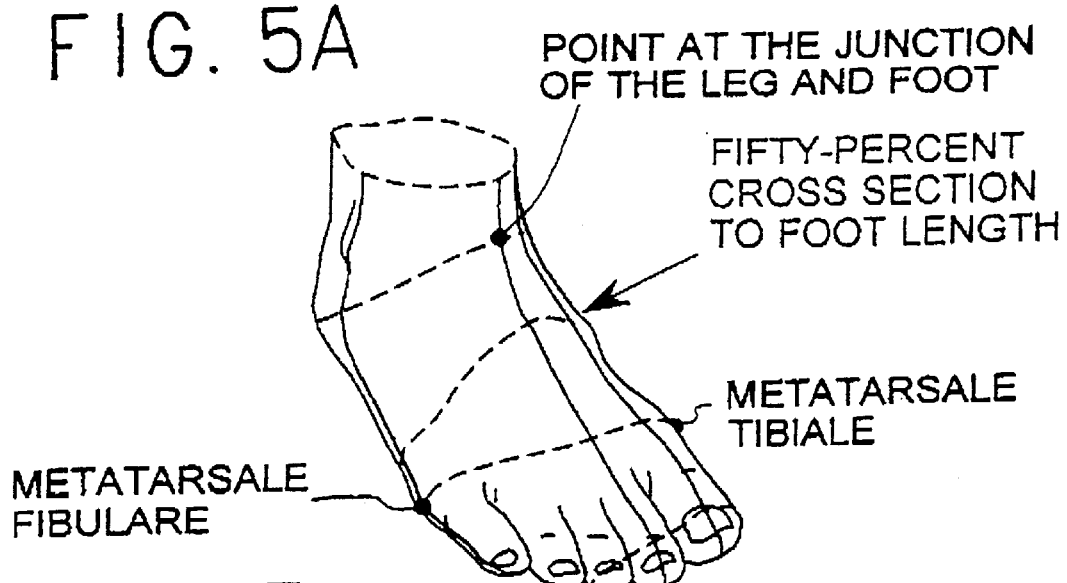
FIGS. 5A to 5C are diagrams showing modeling and foot shape data based on the anatomical landmarks.

Here, in a foot shape, anatomical landmarks of the human body represent skeletal characteristic points including metatarsale fibulare, metatarsale tibiale, and pternion in FIGS. 2A and 2B. Likewise, in the trunk part of the human body shape, anatomical landmarks of the human body represent skeletal characteristic points including trochanterion, acromion and thelion (bust point) in FIGS. 3A and 3B. Anatomical landmark can be defined on the soft tissue such as the point at the junction of the leg and foot in FIG. 5A or thelion (bust point) in FIGS. 3A and 3B.

[Virtual Shape Forming Unit]

The virtual shape forming unit includes an input/output unit, a CPU (Central Processing Unit) for processing data, and a memory. Operations processed by this unit are sequentially described.

(1) Obtain Multidimensional Distribution Map

Initially, the virtual shape forming unit generates the multidimensional distribution map. As described above, the three-dimensional shape measurement unit reconstructs the shape data of the N people based on the anatomical landmarks. The virtual shape forming unit computes the inter-shape distance (non-similarity) of the shape data of the N people. There are two preferable methods for this computation.

The first one is a method for computing the moving pattern of the control lattice point based on a free form deformation method which mutually transforms the shape data of the N people and for defining the inter-shape distance as the amount of distortion thereof. Since the details of this method are already disclosed in Japanese Patent No. 3,106, 177, they are described in detail. In short, in two shape data A and B reconstructed using the anatomical landmarks, the control lattice point for the free form deformation method is set around the shape data A. When the control lattice point is appropriately moved to be distorted so that the shape data A corresponds to the shape data B, the inter-shape distance (non-similarity) between the shape data A and the shape data B is defined using the total amount of movement of the control lattice point.

The second method is a method which defines as the inter-shape distance the total of the distances between the corresponding points of the above-described reconstructed shape data of the N people. In the former method, even though there is uniformity in the reconstruction of the shape based on the anatomical landmarks, the inter-shape distance which uniformly evaluates the entirety of the shape can be computed. However, computation processing takes time. By computing all of the inter-shape distances (non-similarities) among the shape data of the N people using any of the methods, an N×N distance matrix can be obtained.

By processing this distance matrix in the virtual shape forming unit, a shape distribution map shown in FIG. 4 can be obtained. This processing is performed using a multidimensional scaling method, which is one of multivariate analysis methods. Although FIG. 4 shows human body shape distribution states of the N people in two distribution axes, coordinate computation can be performed in a distribution map having more dimensions (the fourth dimensions, the fifth dimensions, etc.)

(2) Computation of Center Virtual Shape

In the virtual shape forming unit, when the above distribution map is obtained, the virtual shape located at the center (in a point in which the coordinates of every distribution axis are zero) of the distribution map is obtained. In a practical sense, this virtual shape is equivalent to what is obtained by averaging data points corresponding to shape data points of the N people, which is referred to as a center virtual shape.

(3) Computation of Peripheral Virtual Shape (1)

A virtual shape which is located at an arbitrary coordinate point $P_t$: $(p_{t1}, p_{t2}, p_{t3}, \ldots p_{ts})$ of the sth dimensional chart (s is an integer, which is 2 or greater) is computed. To do this, initially, virtual shapes on the line connected between the above arbitrary coordinate point and the central point $P_o$: $(0, 0, 0 \ldots 0)$ of the distribution map are computed using interpolation.

M distribution map coordinate points on the above lines are $P_m$: $(p_{m1}, p_{m2}, p_{m3}, \ldots p_{ms})$; $m=1\ldots M$ and coordinate points on the shape distribution map of the N people are $P_n$: $(p_{n1}, p_{n2}, p_{n3}, \ldots p_{ns})$; $n=1\ldots N$. Using a quasi-Newton's method, optimization computation is performed on a weighting coefficient $C_{mn}$ ($C_{mn} \geq 0$) for computing the mth virtual shape $P_m$ so that an evaluation function E defined by the following expression 1 is minimized.

$$E = \sum_{i=1}^{s} \left( p_{mi} - \sum_{n=1}^{N} C_{mn} \cdot p_{ni} \right)$$

Expression 1

Coordinate points in the real space which constitute virtual shapes located at the distribution coordinate points $P_m$ are $V_{mk}$: $(X_{mk}, Y_{mk}, Z_{mk})$; $M=1\ldots M$, $k=1\ldots K$ (K is the number of vertices of the shape data reconstructed based on the anatomical landmarks). Coordinate points in the real space which constitute three-dimensional shapes of the N people are $V_{nk}$: $(X_{nk}, Y_{nk}, Z_{nk})$; $n=1\ldots N$, $k=1\ldots K$. The $V_{mk}$ is computed based on the above weighting coefficient $C_{mn}$ and the coordinate points $V_{nk}$ of the three-dimensional shapes of the N people using the following expression 2.

$$V_{mk} = \frac{\sum_{n=1}^{N} C_{mn} V_{nk}}{\sum_{n=1}^{N} C_{mn}}$$

Expression 2

However, in this method, all of the virtual shapes located at the arbitrary points $P_m$ in the distribution map cannot be computed. Since this method is performed by interpolation computing the virtual shapes based on the measured shape data of the N people, the virtual shapes in peripheral regions of the distribution map cannot be computed (the above weighting coefficient $C_{mn}$ cannot be identified using the optimization computation). In this case, the virtual shapes are computed using the below-described method.

(4) Computation of Peripheral Virtual Shape (2)

The m virtual shapes on the line of the distribution map obtained using the above method show characteristics in which a human body shape varies in a three dimensional manner along a specific line of the distribution map. The tendency, in which the shape varies along the line of the distribution map, is re-described as the control lattice point moving pattern of the free form deformation method. By extrapolating the control lattice point moving pattern along the line of the distribution map and applying the moving pattern to the above center virtual shape, the virtual shapes located at the arbitrary coordinate points $P_t$: $(p_{t1}, p_{t2}, p_{t3} \ldots p_{ts})$ on the distribution map are computed.

Specifically, the control lattice point moving pattern of the free form deformation method for causing the virtual shape forming unit to distort the above center virtual shape into the virtual shape located at the above computed distribution map coordinate point $P_m$ is computed. Details are disclosed by the inventors of the present invention in Japanese Patent No. 3,106,177. in short, in two shape data A and B reconstructed based on the anatomical landmarks, when the control lattice point for the free form deformation method is set around the shape data A and are appropriately moved so that the shape data A corresponds to the shape data B, the amount of movement of the control lattice point is optimized so that the amount of movement of the control lattice point is minimized and the total of distances among points of the shape data A and the corresponding points of the shape data B are minimized.

In the case of the human body shape distribution, the amount of movement of the computed control lattice point in the real space in the directions of the X axis, the Y axis, and the Z axis and the amount of displacement between the distribution map coordinate point $P_m$ and the distribution map central point $P_o$ have substantially linear relationship. Therefore, the above amount of movement can be represented using a regression expression based on the above amount of displacement. According to this regression expression, the amount of movement of the control lattice point can be extrapolated in the distribution map coordinate points $P_t$: $(p_{t1}, p_{t2}, p_{t3}\ldots p_{ts})$ that are more periphery to the distribution map coordinate points $P_m$ which can be computed using the above method. By applying this control lattice point moving pattern to the above center virtual shape, the peripheral virtual shape located at the distribution map coordinate points $P_t$: $(p_{t1}, p_{t2}, p_{t3} \ldots p_{ts})$ can be computed.

(5) Realization

The peripheral virtual shape computed using the above method is shape data constructed using a plurality of vertices (K points) based on the anatomical landmarks. Generally speaking, K is approximately several hundred, which is sufficient number for studying the distribution characteristics of the human body shape. However, it is often insufficient number for being used as product compatibility evaluation. Therefore, by replacing the above-described center virtual shape with detailed shape data having several million vertices and by applying the above-described control lattice point movement pattern to this detailed center virtual shape, the detailed peripheral virtual shape having hundreds of thousand of vertices can be compute.

This detailed peripheral virtual shape is converted into cross-sectional data. The above-described realizing unit can realize the cross-sectional data using a rapid prototyping art such as a light modeling method. Although, here, the light modeling method is used as an example, other methods, such as a cutting method by a numerically controlled machine, may be used.

Embodiment

Figure 5B:
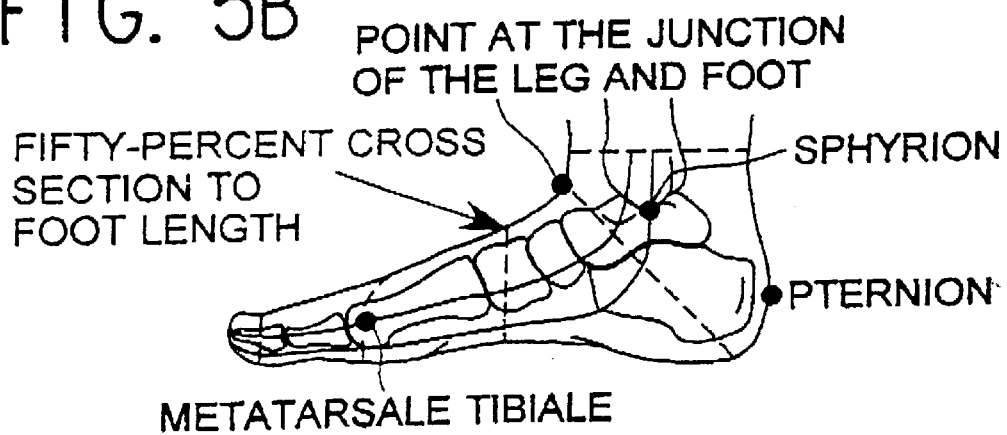

As an embodiment of the present invention, an example is shown in which the shape distribution map of 63 adult female foot shape examples is obtained and peripheral virtual shapes on the distribution axis of the distribution map are computed. These shape data are obtained by making a plaster cast of a foot in a standing position, modeling it based on the locations of anatomical landmarks (FIG. 5A and FIG. 5B) and inputting a data point one by one using a mechanical-arm type three-dimensional shape measurement unit.

Figure 5C:
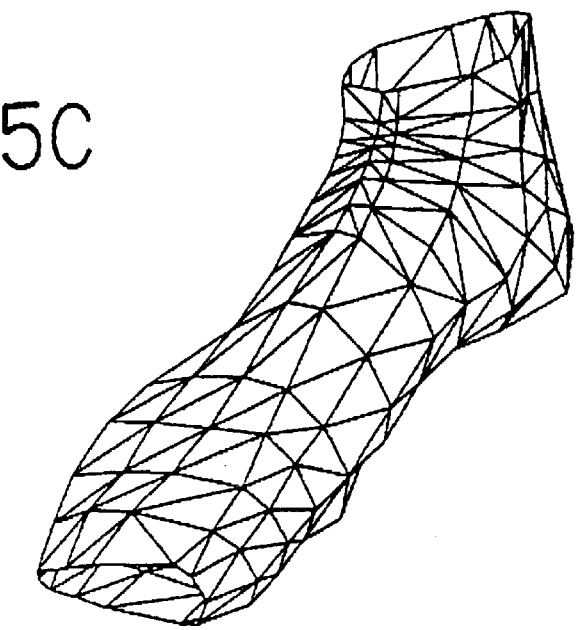

Although not shown in the figures, one shape data is polyhedron data (FIG. 5C) which consists of 324 triangles, each of which is obtained by connecting data faces each having 174 points. Regarding the 63 foot shape models interrelated based on the anatomical landmarks, the inter-shape distance is computed using the method according to the present invention. The obtained distance matrix is processed using the multidimensional scaling method.

FIG. 4 shows distribution of the first axis and the second axis among what is obtained by computing fourth dimensional solutions using the multidimensional scaling method. The peripheral virtual shapes in such locations so as to be each displaced by 3x the standard deviations thereof from the origin of the distribution map along these two axes are computed.

Figure 6A:
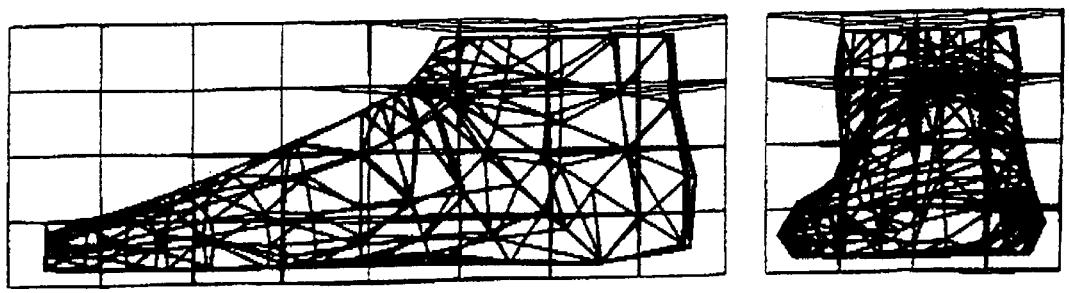
FIGS. 6A and 6B are diagrams each showing a moving pattern of a free form deformation lattice.
Figure 6B:
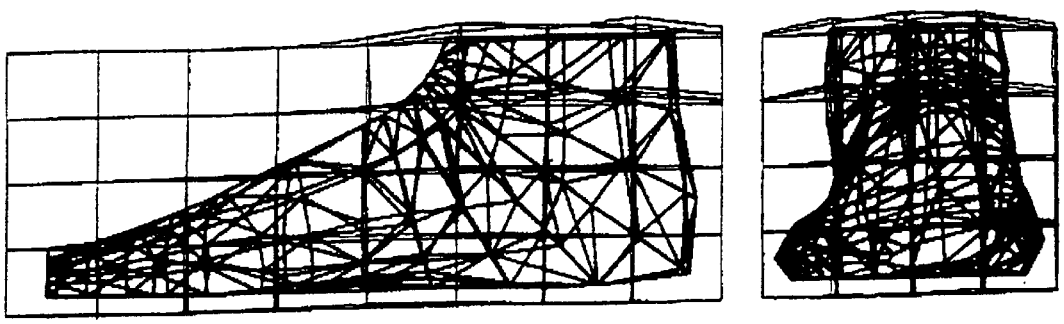

Initially, in the proximity of the origin of the distribution map, virtual shapes located on the distribution axis are computed using the expression (1) of the periphery virtual shape according to the present invention. In the case of this embodiment, with respect to the first axis, the periphery virtual shape can be computed in a range of −1.25 to +1.15 using the standard deviation as a unit, and with respect to the second axis, the periphery virtual shape can be computed in a range of −0.7 to +0.7 using the standard deviation as a unit. Hence, with respect to the first axis, virtual shapes located at −1.25, ±1.0, ±0.75, ±0.5, ±0.25, and ±1.15 are computed and, with respect to the second axis, virtual shapes located at ±0.7, ±0.6, ±0.45, ±0.3, and ±0.15 are computed. FIGS. 6A and 6B show examples of resultant virtual shapes and the moving pattern of the free form deformation method distorted lattice for converting the virtual shape located at the center to the virtual shape located on these axes. FIG. 6A shows conversion from the shape (0, 0, 0, 0) located at the center into the virtual shape located at −1.0 standard deviation (−1, 0, 0, 0) on the first axis of the distribution map. FIG. 6B shows conversion from the shape (0, 0, 0, 0) located at the center to the virtual shape located at +1.0 standard deviation (+1, 0, 0, 0) on the first axis of the distribution map.

Figure 7:
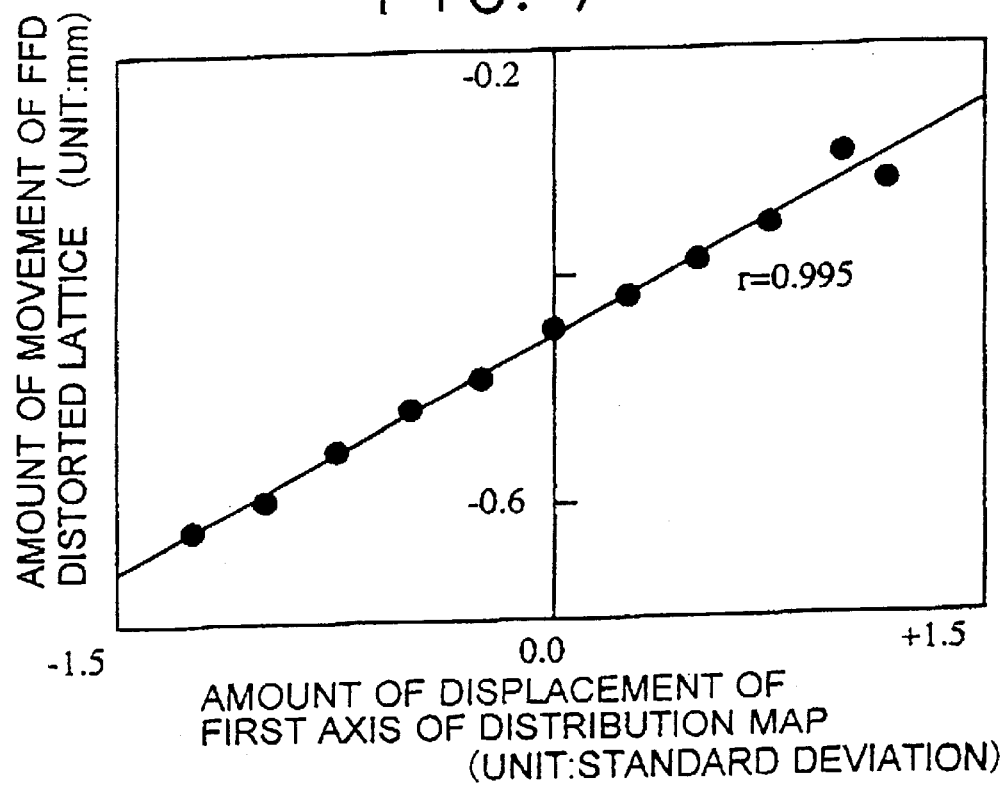
FIG. 7 is a diagram showing an amount of displacement of the first axis of the distribution map and an amount of movement of the free form deformation lattice.
Figure 8A:
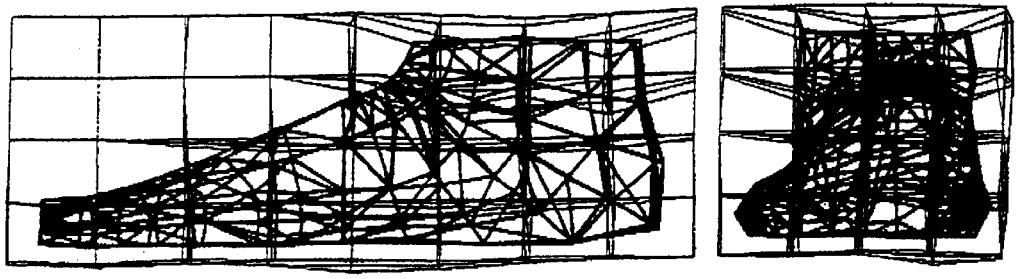
FIGS. 8 and 8B are diagrams showing standard deviation shapes of the first axis of the distribution map.
Figure 8B:
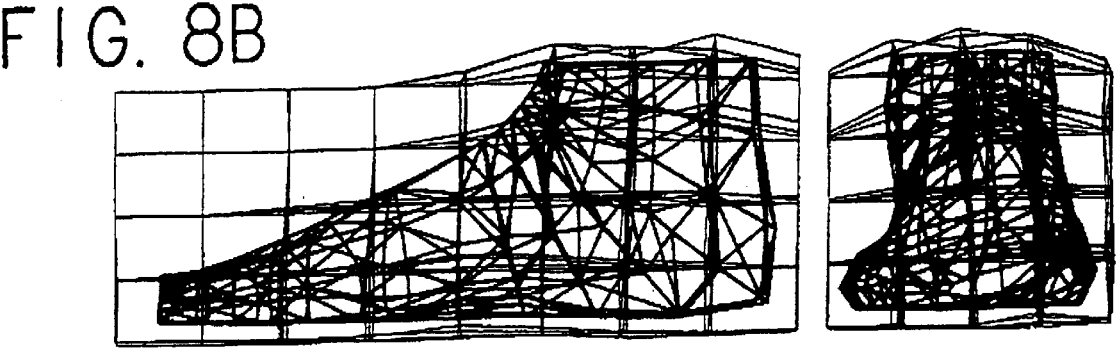
Figure 9A:
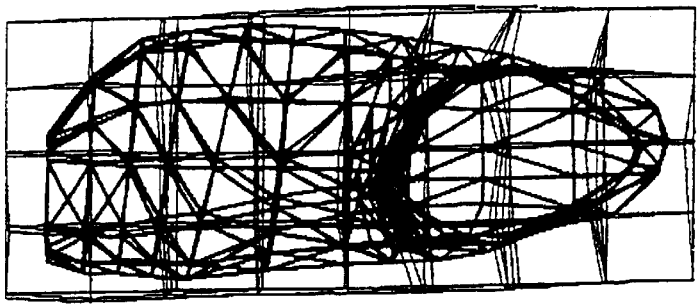
FIGS. 9 and 9B are diagrams showing standard deviation shapes of the second axis of the distribution map.
Figure 9B:
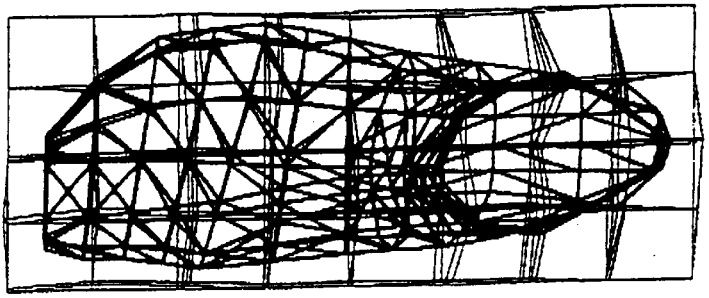

The amount of movement of each free form deformation method distorted lattice and the displacement from the central location of the distribution map have substantially linear relationship, as shown in FIG. 7. Therefore, the amount of movement of the free form deformation method distorted lattice is modeled using the regression expression with respect to displacement from the central location of the distribution map. By complying with this regression expression, the virtual shape at more periphery part which cannot be computed using expression (1) of the periphery virtual shape can be computed, which is expression (2) of the periphery virtual shape. The periphery virtual shapes at the locations of ±3 standard deviations of the first axis computed using this expression are shown in FIGS. 8A (+3.0) and 8B (−3.0) The periphery virtual shapes at the locations of ±3 standard deviations of the second axis are shown in FIGS. 9A (+3.0) and 9B (−3.0).

When the shapes obtained in this manner are compared, concrete shape characteristics of each axis of the three-dimensional shape distribution map shown in FIG. 4 can be visually recognized. In addition, when detailed peripheral virtual shapes are realized using the device according to the present invention, it is possible to evaluate the compatibility of a product as a group by applying the peripheral virtual shape to the product designed for the shape ("mode" shape) located at the center of this distribution map.

When a product adjusted to a customer is designed and the product is designed as not a custom-made product but a mass production product for a group (a specific customer bracket), not only product design for the average shape representing the group, but also compatibility evaluation of the product to a virtual shape located in the periphery of the variations of the group must be needed.

When the realized periphery virtual shape obtained by the present invention is used, by applying a developed product to the realized periphery virtual shape, an allowable margin of the product is estimated. Alternatively, the product can be readjusted. An advantage of performing evaluation using the realized periphery virtual shape not using a specific individual (actual person) is to solve a difficulty in finding a person located in the periphery of the group as well as to be capable of performing evaluation using a shape having only features of the periphery of the group excluding peculiarities of specific individuals.

Furthermore, as shown in the present invention, by formulating variation characteristics on the distribution axis of the group as a moving pattern of the lattice point, shape data located at ±3 standard deviation can be estimated from a small amount of shape data (one hundred or less people) not from an enormous amount of three-dimensional data (tens of thousands of people). This means that the group characteristics can be estimated using the distribution model without collecting a large amount of human body data. This is similar to a case in which the group characteristics can be estimated from a small amount of data when the normal distribution is assumed. That is, when governments, companies, or the like collect data, without performing large-scale measurement regarding tens of thousands of people, derivation and formation of shape distributions and periphery virtual shapes can be realized using data regarding a hundred or less people.

As described above, the present invention is described based on the embodiment. However, the present invention is not limited to this embodiment. It is obvious that various modifications may be made in the present invention without departing from the scope defined in the appended claims.

What is claimed is:

1. A method in which three-dimensional shape data of a plurality of people is obtained by measuring the body shape thereof, a multidimensional distribution map is formed based on said three-dimensional shape data of said plurality of people, and a virtual shape located on the periphery of the multidimensional distribution map is formed, whereby the virtual shape is generated, the method for generating the virtual shapes of the plurality of three-dimensional shapes being characterized in that:
   - a space distortion function which mutually distorts said three-dimensional shape data of said plurality of people using the free form deformation method is computed;
   - a multidimensional distribution map of said three-dimensional shape data of said plurality of people is generated; and
   - a virtual shape existing at an arbitrary location of said multidimensional distribution map is derived.

2. A device for generating a virtual shape on a distribution map of a plurality of three-dimensional shapes comprising:
   - a three-dimensional shape measurement unit for measuring human shapes and outputting the measured human shapes as three-dimensional shape data of a plurality of people;
   - a virtual shape forming unit for forming a multidimensional distribution map based on said three-dimensional shape data of said plurality of people and forming the virtual shape located in the periphery of said multidimensional distribution map; and
   - a three-dimensional realizing unit for realizing numerical data from said virtual shape forming unit, the device for generating virtual shapes of the plurality of three-dimensional shapes characterized in that said virtual shape forming unit has functions such that:
     - a space distortion function which mutually distorts said three-dimensional data of said plurality of people is computed using the free form deformation method;
     - a multidimensional distribution map of said three-dimensional shape data of said plurality of people is generated based on the magnitude of the space distortion; and
     - the virtual shape of an arbitrary location of said multidimensional distribution map is derived.

* * * * *